No. 611,782. Patented Oct. 4, 1898.
W. FORSYTH.
PREPARATION OF FRUIT.
(Application filed June 23, 1898.)
(No Model.) 4 Sheets—Sheet 1.

No. 611,782. Patented Oct. 4, 1898.
W. FORSYTH.
PREPARATION OF FRUIT.
(Application filed June 23, 1898.)
(No Model.) 4 Sheets—Sheet 2.

WITNESSES:

INVENTOR
William Forsyth
BY
Henry D. Williams
ATTORNEY

No. 611,782. Patented Oct. 4, 1898.
W. FORSYTH.
PREPARATION OF FRUIT.
(Application filed June 23, 1898.)
(No Model.) 4 Sheets—Sheet 3.
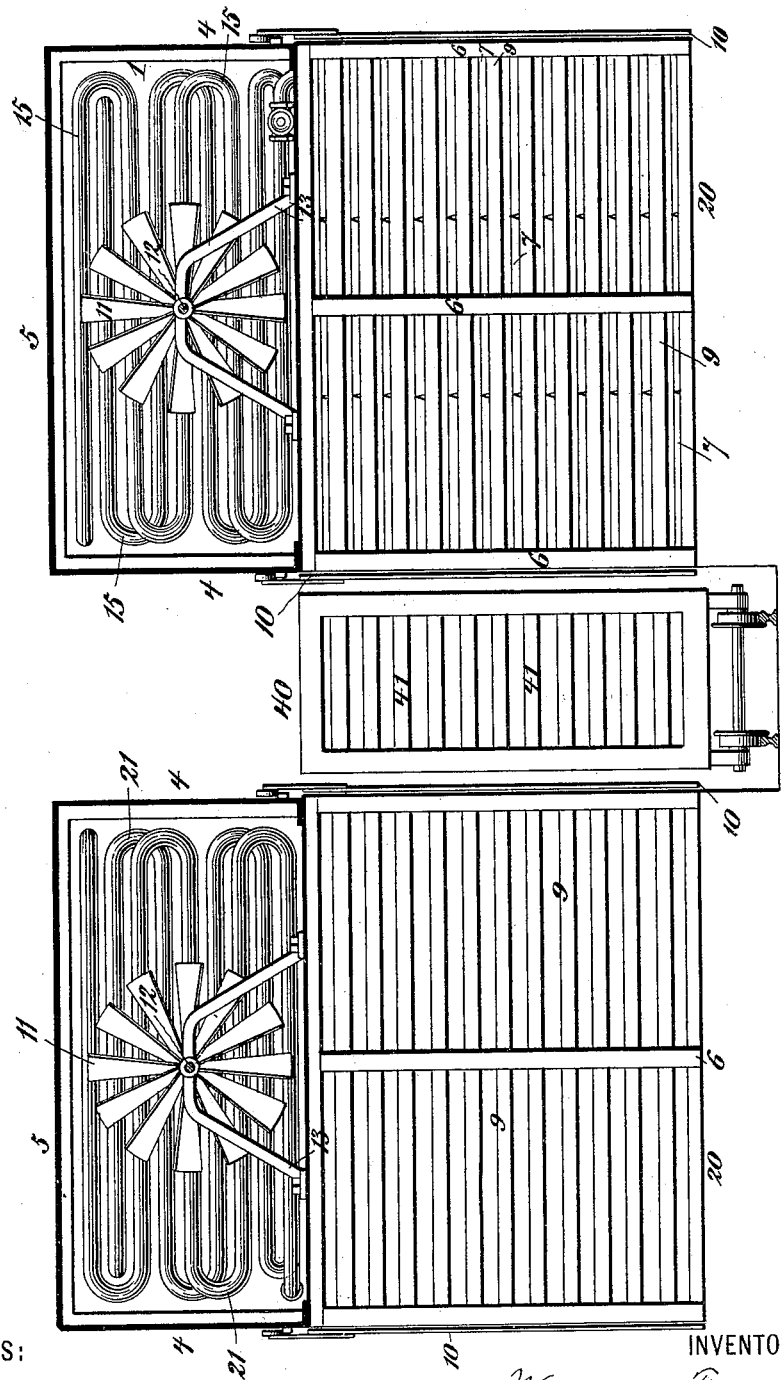
WITNESSES:
INVENTOR
William Forsyth
BY
Henry D. Williams
ATTORNEY

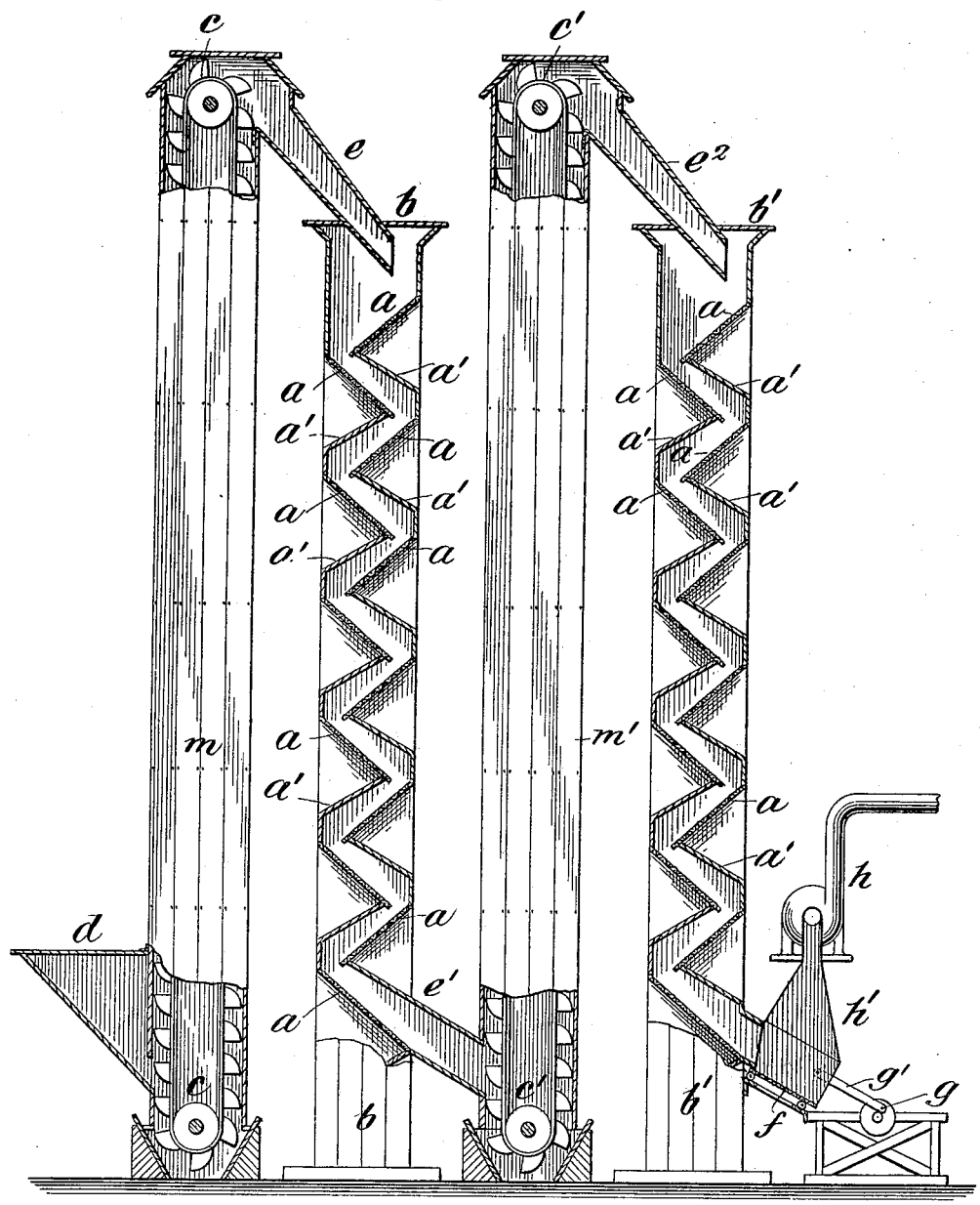

UNITED STATES PATENT OFFICE.

WILLIAM FORSYTH, OF FRESNO, CALIFORNIA.

PREPARATION OF FRUIT.

SPECIFICATION forming part of Letters Patent No. 611,782, dated October 4, 1898.

Application filed June 23, 1898. Serial No. 684,321. (No specimens.)

*To all whom it may concern:*

Be it known that I, WILLIAM FORSYTH, a citizen of the United States, and a resident of Fresno, county of Fresno, State of California, have invented certain new and useful Improvements in the Preparation of Fruit, of which the following is a specification, reference being had to the accompanying drawings, forming part hereof.

This invention relates to the preparation of dried fruit, and more particularly of raisins, and has for its objects generally to improve the quality of the fruit and to effect the complete breaking off and separation of the stems by bringing the fruit into such a condition that the fruit and the points of attachment of the stems are hard and brittle and stemming and cleaning the fruit while in such condition.

According to my invention the fruit is first heated and then quickly cooled and thereby brought to the desired hard and brittle condition. The breaking off of the stems is effected by abrasion, and the separation of the stems and other material is effected by a separating treatment, such as by screening or blowing or otherwise, all while the fruit and stems are in a hard and brittle condition.

The accompanying drawings illustrate apparatus adapted to the carrying out of my process.

Figure 1:
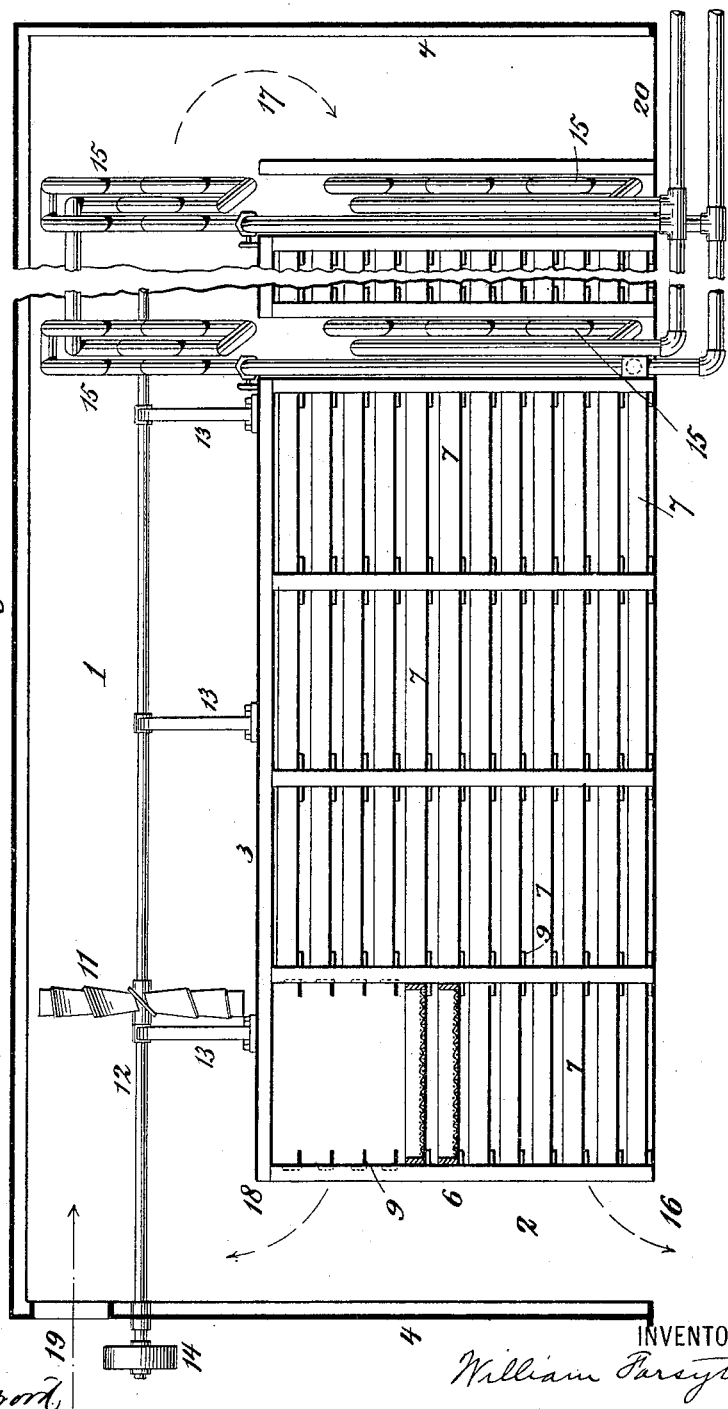
Figure 2:
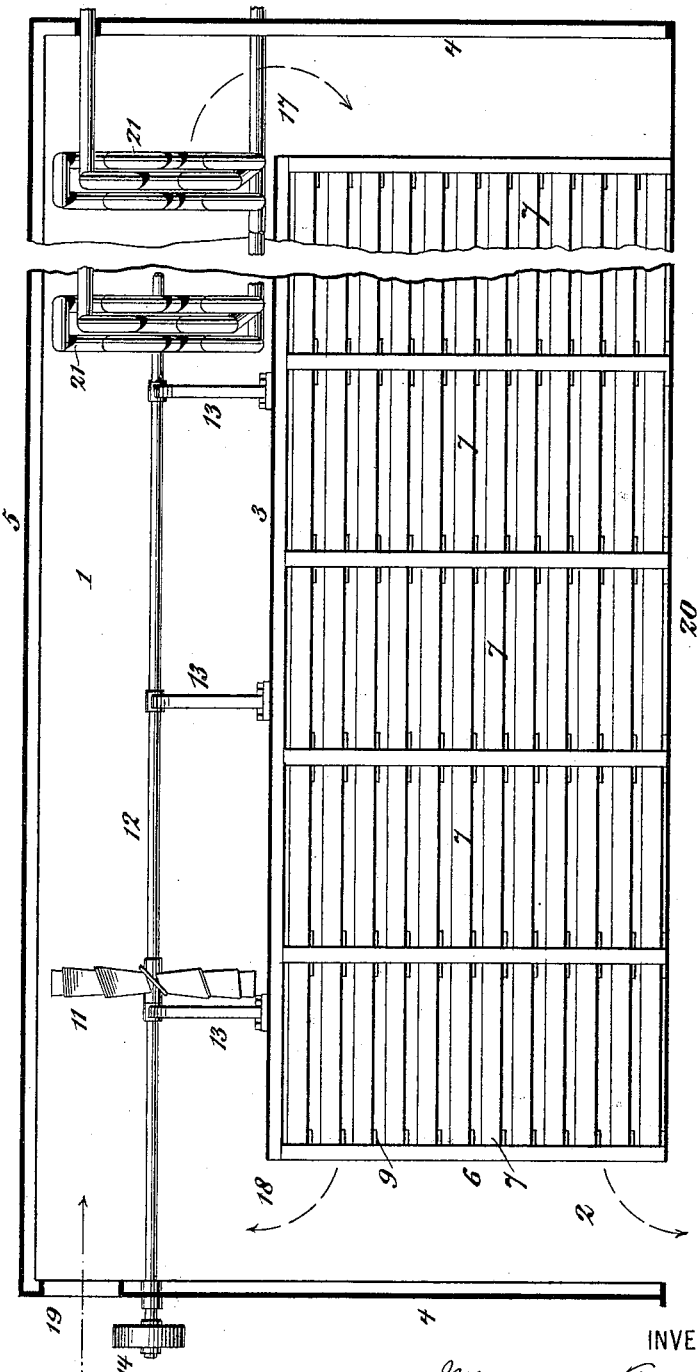

Figure 1 is a longitudinal vertical section, medially broken away, of a heating apparatus or heater. Fig. 2 is a similar view of the cooling apparatus or cooler. Fig. 3 is an end elevation of the heater and cooler and of a car for transferring the trays from the heater to the cooler. Fig. 4 is a side elevation, partly in section, of an apparatus for stemming and cleaning the fruit.

The apparatus shown, comprising a heater, a cooler, and a stemming and cleaning apparatus, are examples of apparatus that may be used in carrying out the process of treatment embodying my invention, but form no part of the present invention, the heater and cooler being described and claimed in my application for Letters Patent filed September 30, 1897, under Serial No. 652,230, and the stemming and cleaning apparatus being that shown in patent to George Pettit, Jr., dated April 26, 1896, No. 603,029.

Other apparatus may be employed in carrying out my process—as, for example, known forms of driers may be used for heating the fruit, and known forms of cooling apparatus may be used for cooling the fruit, and other known forms of cleaning and stemming apparatus than that shown may be employed for detaching and separating the stems and cleaning the fruit, or new forms of these apparatus may be designed adapted for carrying out my process.

The heater shown comprises two inclosed chambers 1 and 2, formed in a suitable structure having walls 4, a roof 5, and a floor 20. The two chambers are located one above the other, the upper chamber 1 and the lower chamber 2 being separated by a suitable flooring 3, having openings 17 and 18, one at each end, connecting the two chambers. The lower chamber 2 is provided with racks 6 for receiving the fruit holders or trays 7, which trays may have wire bottoms, as shown, and the racks have slides 9, upon which the ends of the trays rest. The side walls of the structure have sliding doors 10, which permit the sides of the structure to be opened, one rack at a time, for the insertion and removal of the fruit-trays 7. The sliding doors are at both sides of the structure, the trays being inserted at one side and removed at the other side.

Rotating fans 11 are provided, located in the upper chamber 1, for circulating a current of air through the chambers, only one of these fans, 11, being shown, and these fans are mounted on the shaft 12, fitted to rotate in standards 13 13 and driven by a pulley 14 outside the structure.

The air is heated as it moves through the structure by heating-coils 15, located in the upper and lower chambers, through which steam or hot water or other heating fluid is circulated. An outlet-opening 16 is provided at the lower part of the lower chamber for the escape of moist and cool air, and an inlet-opening 19 is provided in the front upper end of the upper chamber 1 for the admission of fresh air.

The cooler shown is of substantially the same construction as the heater, except that the fluid-circulating coils are located only in the upper chamber, and through these coils 21 a cooling or refrigerating fluid is circulated. In other respects the corresponding parts are lettered as in the drawing of the heater and need not be further described.

For transferring the fruit from the heater to the cooler a car 40 is shown, which may be only of the length of one set of trays, and is provided with slides 41, corresponding to the slides 9 of the heater and cooler, so that when the car is moved into proper position alongside of any set of trays and the doors of the heater and cooler facing the car are opened the slides of the car will bridge the space between the heater and cooler, and the trays may be pushed from the heater through the car and into the cooler, and thus the contents of the heater may be quickly transferred into the cooler, as is desirable in carrying out my improved process of treatment.

The apparatus shown for stemming and cleaning the fruit comprises a receiving-hopper $d$, an elevator $c$ in a vertical shaft $m$, from the upper end of which a chute delivers the fruit to a vertical shaft $b$ with inclined riddles $a$ and deflecting-boards $a'$, a chute $e'$, leading to a second elevator $c'$ in a vertical shaft $m'$, from the upper end of which a chute $e^2$ delivers to a second vertical shaft $b'$ with inclined riddles and deflecting-boards, a vibrating sieve $f$, actuated by crank $g$ and connecting-rod $g'$, and an exhausting-blower $h$ above a flue $h'$, leading upward from said vibrating sieve $f$.

My process has been designed, primarily, for the treatment of raisins, to which it is peculiarly adapted. In the treatment of raisins the bunches are first broken up and the long stems partially or wholly separated in any usual manner, and the raisins are spread out in trays in loose condition and the trays are placed in the heater. The temperature to which the raisins are heated depends upon the condition of the raisins, and the right degree of heat for the best results is readily determinable in practice. Care must be taken not to burn the raisins; but in some instances the temperature may be raised as high as 150° Fahrenheit, more or less, the degree of heat being governed to some extent by the duration of the treatment and a temperature in the neighborhood of 100° Fahrenheit or lower being at times sufficient, if sufficiently prolonged. After the proper condition of the raisins has been reached they should be transferred to the cooler, where they will be quickly cooled to a temperature in the neighborhood of normal temperature or lower, and will thereby be brought to a hard and brittle condition and the points of attachment of their stems made brittle. This hard and brittle condition will continue only for a limited time, and the stemming and cleaning should therefore be performed promptly or within a few hours. In the stemming and cleaning the raisins are subjected to an abrasive treatment, whereby the butt-stems are broken off at their points of attachment to the raisins, and to a separating treatment, such as a sieving or screening, whereby the detached stems and other foreign matter are separated, which stemming or screening may be supplemented or replaced by other suitable separating treatment, such as blowing, the abrasion and screening being conjointly effected by the inclined riddles of the stemming and cleaning apparatus shown and a subsequent blowing being effected by the fan-blower shown.

The hard and brittle condition of the raisins and of the stems and points of attachment thereof by eliminating to a large extent the usual soft, gummy, sticky, and adhesive condition permits the butt-stems to be readily and reliably broken off at their points of attachment by slight abrasion or rubbing, whereas these stems and their points of attachment are normally so pliable and tough that they can only be effectively detached by hand-picking and also facilitates the separation of the stems and foreign material from the fruit.

My new process of treatment also possesses the advantage of improving the quality of the raisins, as it brings about a condition of the raisins such that they will retain for a long period a dark and an attractive appearance, as is desirable, and this is particularly valuable in raisins that are to be placed upon the market in seeded condition, as the tendency to discolor, sugar, or crystallize is much greater in these seeded raisins than in unseeded raisins.

Under certain conditions the cooling of the raisins, as above described, may be effected without special apparatus or by subjecting them to a current of air not artificially cooled; but in hot climates it will usually be desirable to provide artificial cooling means.

It is evident that various modifications may be made in the procedure above described and that parts thereof may be employed with beneficial results.

What I claim as my invention, and desire to secure by Letters Patent, is—

1. The process of treating dried fruit which consists in heating the fruit and then cooling it, substantially as set forth.

2. The process of treating dried fruit which consists in heating the fruit and then subjecting it to a current of air whereby it is quickly cooled, substantially as set forth.

3. The process of treating dried fruit which consists in subjecting the fruit to a current of warm air whereby it is heated and then subjecting it to a current of cool air whereby it is quickly cooled, substantially as set forth.

4. The process of treating dried fruit which consists in heating the fruit and then cooling it, whereby the points of attachment of the stems are rendered brittle, and then subjecting it to abrasive treatment whereby the stems are detached, substantially as set forth.

5. The process of treating dried fruit which consists in heating the fruit and then cooling it, whereby the fruit and the points of attachment of the stems are rendered hard and brittle, and then subjecting the fruit to abrasive and separating treatment, whereby it is stemmed and cleaned, substantially as set forth.

6. The process of treating dried fruit which consists in subjecting the fruit to a current of warm air whereby it is heated and then subjecting it to a current of cool air whereby it is quickly cooled, and then subjecting it to abrasive and separating treatment whereby it is stemmed and cleaned, substantially as set forth.

7. The process of treating raisins which consists in heating the raisins and then cooling them, substantially as set forth.

8. The process of treating raisins which consists in heating the raisins and then subjecting them to a current of air whereby they are quickly cooled, substantially as set forth.

9. The process of treating raisins which consists in subjecting the raisins to a current of warm air whereby they are heated and then subjecting them to a current of cool air whereby they are quickly cooled, substantially as set forth.

10. The process of treating raisins which consists in heating the raisins and then cooling them, whereby the points of attachment of the stems are rendered brittle, and then subjecting them to abrasive treatment, whereby the stems are detached, substantially as set forth.

11. The process of treating raisins which consists in heating the raisins and then cooling them, whereby the raisins and the points of attachment of the stems are rendered brittle, and then subjecting the raisins to abrasive and separating treatment, whereby they are stemmed and cleaned, substantially as set forth.

12. The process of treating raisins which consists in subjecting the raisins to a current of warm air whereby they are heated and then subjecting them to a current of cool air whereby they are quickly cooled and then subjecting them to abrasive and separating treatment whereby they are stemmed and cleaned, substantially as set forth.

Signed at Fresno, county of Fresno, State of California, this 14th day of June, A. D. 1898.

WILLIAM FORSYTH.

Witnesses:
E. F. MITCHELL,
M. B. HARRIS,
L. W. MOWLTRIE.